June 10, 1941.  G. A. LYON  2,244,913
WHEEL DISK
Filed Oct. 21, 1938
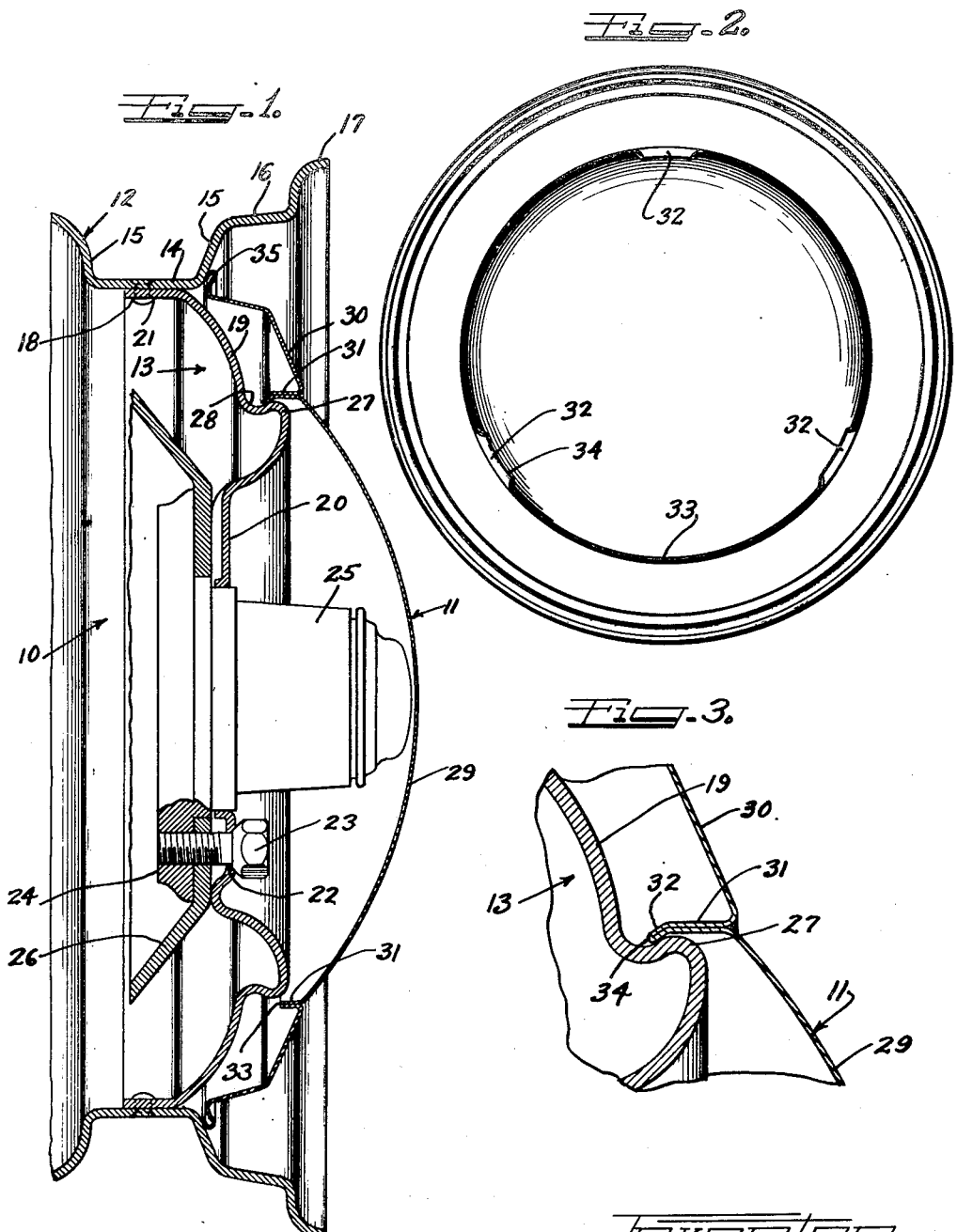
Inventor
GEORGE ALBERT LYON.
by Charles Patented June 10, 1941

2,244,913

UNITED STATES PATENT OFFICE 2,244,913

WHEEL DISK

George Albert Lyon, Allenhurst, N. J.

Application October 21, 1938, Serial No. 236,163

10 Claims. (Cl. 301—37)

This invention relates to a wheel assembly, and more particularly to a wheel assembly in which the wheel disk makes a snap-on engagement with the vehicle wheel by means of a plurality of spring means integral with the wheel disk itself.

The majority of vehicle wheels today are equipped with ornamental wheel disks over their outer surfaces. The use of these wheel disks permits a more economical manufacture of vehicle wheels, since the wheels themselves may be designed solely for strength and utility, without regard to ornamental appearance, the wheel disk being employed for the latter purpose. The most popular form of wheel disk at the present time is a wheel disk having a highly polished exterior surface. The exterior surface of the wheel disk may, of course, be finished in any other suitable manner, such as by enameling it or the like.

In order to minimize the total cost of the wheel assembly, it is, of course, necessary to minimize the cost of the wheel disk itself as much as possible. The thinner the sheet metal stock is, which is employed to make the wheel disk, the greater the saving is in the manufacturing cost. It has been found that wheel disks may be constructed of a sheet of metal stock having a thickness dimension of such a character that if a single thickness of metal stock is engaged by any fastening means or any other similar strain is placed thereon, the metal of the disk is deformed at that point, but which, when presented as a double thickness of metal formed by a fold, the metal in the disk thereof is not deformed.

A further item in the wheel assembly which contributes substantially to the manufacturing costs of the wheel assembly of the type that is commonly known at the present time is the separate spring-finger or attaching element which is employed to detachably secure the wheel disk over the front face of the wheel. It will, of course, be appreciated that the wheel disk must be detachable from the wheel in order to permit access to the wheel mounting bolts which secure the wheel to the axle mounting element. The present invention provides a novel form of wheel disk which cooperates with a novel vehicle wheel in a novel manner, which eliminates the use of a separate spring mounting finger which must be permanently mounted to one of the elements of the assembly and arranged to detachably secure the elements together. More particularly, the wheel disk and vehicle wheel are so designed that portions of the wheel disk itself act as attaching means or fingers.

Accordingly, it is one object of the present invention to provide a wheel disk and wheel assembly having the above highly desirable characteristics.

Another object of this invention is to provide a novel wheel disk which is economical to manufacture and which is rugged and reliable in use.

A further object of this invention is to provide a novel wheel disk and wheel assembly in which the wheel disk is detachably secured to the wheel by means integral therewith.

A still further object of this invention is to provide a novel wheel disk having resilient fastening fingers formed of a double fold of metal.

Another and further object of this invention is to provide a novel combination of wheel disk and vehicle wheel.

Another and still further object of the present invention is to provide a novel wheel disk having integral tightly folded resilient fingers thereon which are arranged to snap over a shoulder or shoulders on a vehicle wheel to detachably secure the disk to the wheel.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawing, in which:

Figure 1 is an elevational view partly in cross-section of a vehicle wheel and wheel disk assembly;

Figure 2 is a rear elevational view of the wheel disk shown in Figure 1; and,

Figure 3 is an enlarged fragmentary sectional view of that portion of the wheel assembly wherein the wheel disk makes a securing engagement with the vehicle wheel.

Referring now to the embodiment of my invention illustrated in the various figures of the drawing, there is shown a wheel assembly comprising a vehicle wheel 10 and a wheel disk or ornamental cover member 11. The form of vehicle wheel shown in the drawing comprises a rim part 12 and a body part 13. The rim part 12 is of the usual drop-center type, including a base flange 14, opposite intermediate side flanges 15, opposite intermediate base flanges 16, and opposite edge portions 17. The drop-center rim 12 as illustrated is of the type which is commonly employed in the automotive vehicle art of the present day, and as is well known to those skilled in the art, is arranged to seat and accommodate a pneumatic tire (not shown).

The body part 13 of the vehicle wheel 10 includes in general a rearwardly extending outer flange 18, a principal body portion 19, and a wheel mounting flange 20. The rearwardly extending outer flange 18 is riveted or otherwise suitably secured to the underside of the base flange 14 of the rim 12, as at 21. The mounting flange 20 is provided with an annular series of apertures 22 for the reception of the wheel mounting bolts 23, which extend therethrough into engagement with the radial attaching flange 24 of the hub 25. As is shown in Figure 1, a radial attaching flange 24 of the hub 25 also mounts the brake drum 26, the brake drum being apertured opposite the wheel mounting bolts 23 to permit the latter to pass therethrough into threaded engagement with the radial attaching flange 24 of the hub 25.

The principal body portion 19 of the wheel 10 is provided with an annular shoulder 27, there being provided an annular groove or indented portion 28 behind the outer extremity of the shoulder 27. As will presently appear, the shoulder 27 provides a portion on the wheel 10 upon which the wheel disk 11 is detachably secured.

The wheel disk 11 includes a relatively large dome-shaped central portion 29, a concentric annular outer portion 30 which may be given any configuration desired, the concentric outer portion being connected to the dome-shaped central portion 29 by an integral double thickness flange 31. The flange 31, with the exception of the finger portions thereof presently to be described, extends directly axially rearwardly, as may be seen by an inspection of the cross-section of the flange 31 in the lower part of Figure 1. It will further be perceived from an inspection of the cross-section of the flange 31 in the lower part of Figure 1 that the positioning and dimensioning of this flange is such that the flange is of slightly greater inside diameter than the maximum outside diameter of the shoulder 27.

In order to provide a tight-gripping engagement of the wheel disk 11 on the wheel 10 without the use of the usual separate spring fingers which have previously been employed to extend between the wheel and the fastening flange of the wheel disk, a plurality of integral, double-thickness resilient fingers 32 are provided on the wheel disk 11. These integral double-thickness fingers 32 may be seen best from an inspection of Figure 2 of the drawing. While three fingers have been illustrated, it will of course be understood that any convenient number of fingers may be employed without departing from the spirit and scope of the present invention.

The resilient double-thickness fingers 32 of the wheel disk 11 are preferably formed by forming an annular fold in the wheel disk 11, as it is being made. The folded, or edge portion of this annular fold is then cut away, as at 33, at intervals therearound, thus leaving only the fingers 32 with the folded end 34. The annular fold formed in the wheel disk 11 thus forms the axially rearwardly extending double-thickness flange 31 and also provides the resilient double-thickness folded fastening fingers 32. The ends of the fastening fingers are then bent obliquely axially rearwardly and radially inwardly, as is clearly shown in the cross-sectional view of the flange 31 and the fingers 32 in the upper part of Figure 1.

Although it has been found that the folded end of the fingers 32 is sufficient to hold the outer annular portion 30 of the wheel disk 11 in secure engagement with the central dome-shaped portion 29, the double-thickness flange 31 may be welded together if desired without departing from the spirit and scope of the present invention.

The fastening fingers 32, when formed as above described, form a resilient but relatively stiff fastening means which is arranged to be snapped over the annular shoulder or hump-shaped portion 27 of the wheel 10. The fingers 32 thus extend partly down into the grooved or recessed portion 28 and engage the rear face of the shoulder 27 to detachably hold the wheel disk 11 in place on the wheel.

The outer portion 30 of the wheel disk 11 may, of course, be given any desired ornamental configuration, as has been previously pointed out. As is shown in Figure 1 of the drawing, the outer annular portion 30 of the wheel disk 11 is provided with an underturned beaded edge 35, which is arranged to be seated on the intermediate outer side flange 15 of the drop-center rim 12. It is to be understood, however, that the outer annular portion 30 of the wheel disk 11 may be arranged to be seated on the body part 13 of the wheel 10, or on any other part of the drop-center rim 12 without departing from the spirit and scope of the present invention.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A wheel disk comprising a dome-shaped central portion, an annular outer portion, and a rearwardly extending flange of double thickness connecting said portions together, said flange including a plurality of integral folded wheel attaching fastening fingers.

2. A wheel disk comprising a dome-shaped central portion, an annular outer portion, and a rearwardly extending flange of double thickness connecting said portions together, said flange including a plurality of integral folded wheel attaching fastening fingers, the outer folded ends of said fingers being bent obliquely radially inwardly and axially rearwardly.

3. In a wheel and wheel disk assembly including a wheel having a body part with an annular fold therein of S-shape cross section, said fold forming a generally radially outwardly extending shoulder and providing an annular groove therebehind, a wheel disk for disposition over the outer face of said wheel, having an integral axially rearwardly extending flange formed of a double thickness of material, said flange including a plurality of integral resilient wheel engaging fingers having a folded end portion, said fingers extending over said shoulder and into said annular groove of said wheel to thereby detachably secure the wheel disk to the wheel.

4. A wheel cover comprising a disk portion, a ring portion concentric therewith, spring fingers integral with and extending from one edge of said ring portion, and spring fingers integral with and extending from the edge of said disk portion, the spring fingers on said two portions being superposed.

5. A wheel cover comprising a disk portion, a ring portion concentric and in contact therewith and having one edge in close proximity to the edge of said disk portion, spring fingers integral with and extending from said edge of said ring portion, and spring fingers integral with and extending from the edge of said disk portion, the spring fingers on said two portions being superposed and nested with their tips connected together.

6. A wheel cover disk comprising a central portion and an outer portion contiguous therewith, spring fingers integral with and extending from the inner edge of said outer portion, and spring fingers integral with and extending from the outer edge of said central portion, the spring fingers on said two portions being connected at their extremities.

7. A wheel cover disk comprising a central portion and an outer portion contiguous therewith, spring fingers integral with and extending from the inner edge of said outer portion, and spring fingers integral with and extending from the outer edge of said central portion, the spring fingers on said outer portion overlying the spring fingers on said inner portion and being integral therewith at their ends.

8. As an article of manufacture, a wheel cover having rearwardly projecting spaced fingers, said fingers comprising integral folded portions of said cover whereby each finger has a double thickness of material.

9. As an article of manufacture, a circular wheel cover comprising two concentric portions joined and held together solely by rearwardly extending integral portions formed into spaced fingers for retaining cooperation with a wheel.

10. As an article of manufacture, a wheel cover comprising inner and outer circular portions connected and held together solely by rearwardly extending and concealed circularly arranged and spaced portions formed into flexible fingers for retaining cooperation with a wheel.

GEORGE ALBERT LYON.